Oct. 25, 1960     O. B. MITCHELL     2,958,079
DEMODULATION SYSTEM
Filed Aug. 27, 1956                             2 Sheets-Sheet 1
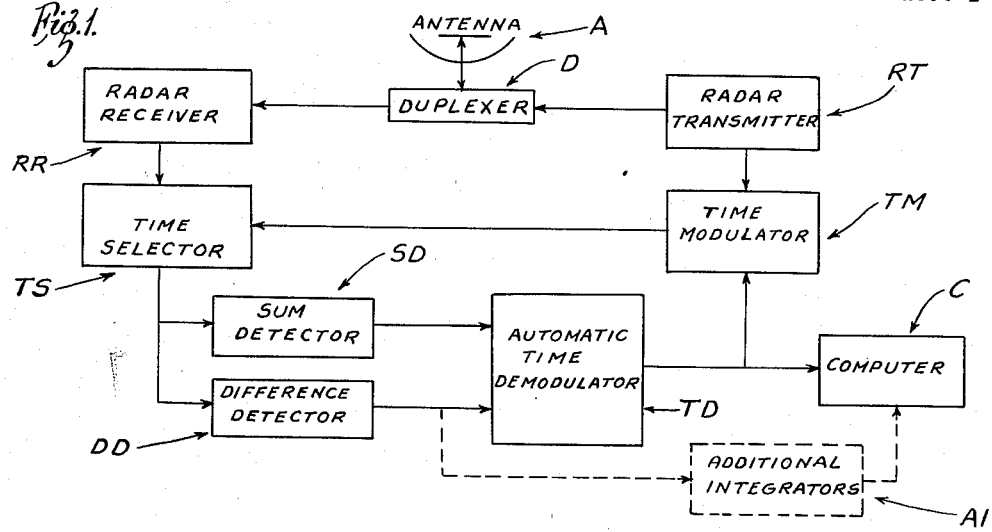
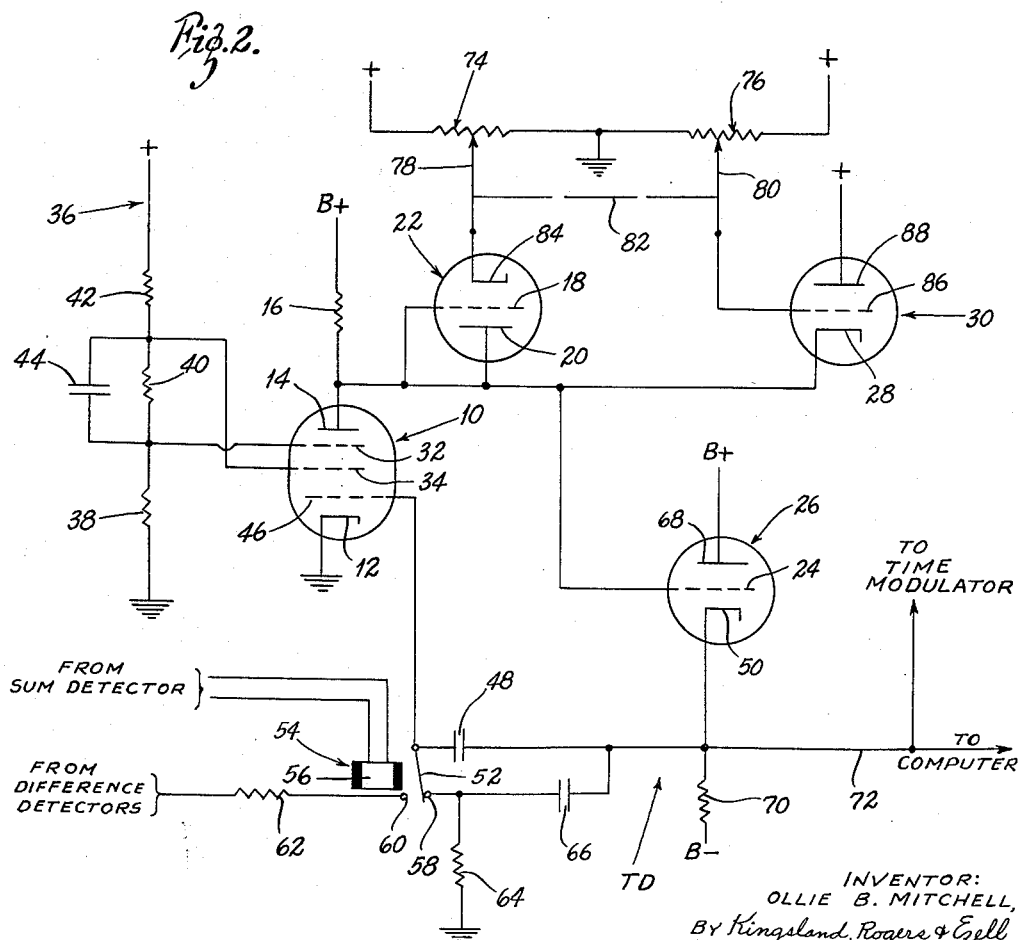
INVENTOR:
OLLIE B. MITCHELL,
BY Kingsland, Rogers & Ezell
ATTORNEYS

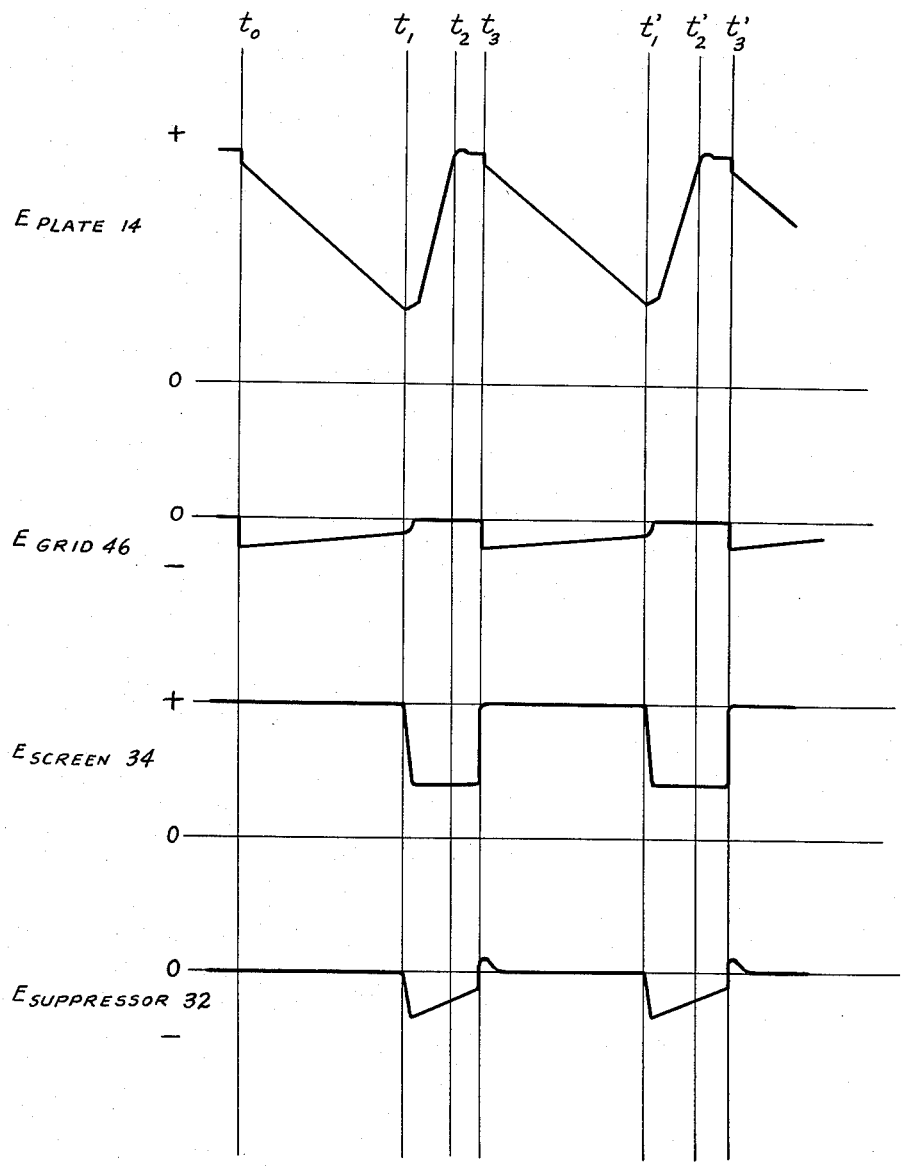

United States Patent Office 2,958,079
Patented Oct. 25, 1960

2,958,079
DEMODULATION SYSTEM

Ollie B. Mitchell, Overland, Mo., assignor to The Emerson Electric Manufacturing Company, St. Louis, Mo., a corporation of Missouri Filed Aug. 27, 1956, Ser. No. 606,303

14 Claims. (Cl. 343—7.3)

The present invention relates generally to electronic range finding circuits and more particularly to a novel radar circuit arrangement for initial automatic detection and subsequent automatic integration of changing range information.

A major concern in the design of automatic time demodulators for use in radar ranging and in similar control problems has been the need heretofore for a separate automatic time search generator in addition to the high gain D.C. amplifier employed for the integrating function. The present invention, however, provides an arrangement wherein the basic hook-up employed for sweeping the gating voltage is utilized also for maintaining closed loop control.

Thus, it is an object of the present invention to provide a novel automatic time demodulator which eliminates the need for a separate integrator and time search generator.

It is another object of the invention to provide a novel circuit arrangement which functions initially as a phantastron time search generator and subsequently as a Miller type integrator.

It is another object of the invention to provide a novel automatic time demodulator which employs the major circuit elements of an integrator in an automatic time searching function.

It is another object of the invention to provide a novel circuit arrangement which functions initially as a sweep voltage generator and which converts automatically to an integrating function at the instant conditions are established for closed loop control.

It is another object of the invention to provide a novel circuit arrangement which functions alternately as a phantastron time search generator and as a Miller integrator and which incorporates circuits for selectively setting precise limits of search.

The foregoing, along with additional objects and advantages, will be apparent from the following description, taken in conjunction with the accompanying drawings, in which:

Figure 1 is a block diagram showing major components of a radar system which incorporates the teachings of the present invention;

Figure 2 is a schematic circuit diagram of the automatic time demodulator of Figure 1; and Figure 3 is a graphic representation showing significant variations in potential of certain elements included in the circuit of Figure 2.

The diagram of Figure 1 depicts a preferred arrangement of major circuit components in a radar system which incorporates an automatic time demodulator conforming to the present invention. The arrowhead applied to the interconnecting lines of this figure indicate in a general sense the normal directional flow of intelligence between components.

The system includes the usual transmitter RT and receiver RR connected through a duplexer D to a directional antenna A. The transmitter RT is also connected to a time modulator TM comprising conventional circuits for generating a main time modulated saw-tooth voltage having a predetermined linear sweep characteristic, matching a variable D.C. reference voltage against the linear sweep of the main saw-tooth voltage, and generating a "gate" pulse at the instant of predetermined correspondence between the compared voltages.

The time modulator TM and the receiver RR are both connected to a time selector TS comprising well known circuits for converting the aforementioned gate pulse to "early pulse" and "late pulse" phases and matching the resulting dual pulse or "selector gate" against the time modulated signal from the receiver RR. The output of the time selector TS is delivered both to a sum detector SD and to a difference detector DD. The sum detector SD comprises commonly understood circuits responsive to synchronization of the selector gate with the time modulated radar signal for switching the system from a "searching" to a "tracking" function, while the difference detector DD comprises equally well known circuits for detecting both the tendency and the direction of incipient de-synchronization between these voltage pulses.

An automatic time demodulator TD connected to receive intelligence from both the sum detector SD and the difference detector DD delivers its output simultaneously back to the time modulator TM and to a computer C. The intelligence thus delivered to the computer C represents basic range information for use in aiming guns and the like.

The time demodulator TD comprises a novel arrangement of circuit elements having dual functions to be described more fully hereinafter. The arrangement, shown schematically in Figure 2, includes a pentode type electron tube 10 having a grounded cathode 12 and having a plate 14 connected through a plate load resistor 16 to a positive voltage B+. The junction between the resistor 16 and the plate 14 is connected to both a grid 18 and a plate 20 of a triode type electron tube 22, to a grid 24 of a triode 26, and to a cathode 28 of a triode 30. The tube 10 has a suppressor grid 32 and a screen grid 34, both of which are connected to a voltage divider 36. The latter comprises a suppressor resistor 38, a screen resistor 40, and a screen load resistor 42, all connected in series between ground and a suitable positive potential. The suppressor grid 32 is connected to the junction of the resistors 38 and 40, while the screen grid 34 is connected to the junction of the resistors 40 and 42. A voltage transfer capacitor 44 interconnects the grids 32 and 34 and is therefore in parallel with the resistor 40.

A main control grid 46 of the pentode 10 is connected through a capacitor 48 to a cathode 50 of the triode 26, and also to a pole 52 of a double throw relay 54. The relay 54 includes a solenoid 56 connected for selective energization, under control of the sum detector SD, to effect switching of the pole 52 between engagement with a normally closed contact 58 and engagement with a normally open contact 60. The latter contact is connected through a grid resistor 62 to the output of the difference detector DD, whereas the contact 58 is connected both through a bias resistor 64 to ground and through a feedback capacitor 66 to the cathode 50 of the triode 26.

A plate 68 of the tube 26 is connected to the B+ voltage, while the cathode 50, in addition to being connected as above-mentioned, is connected through a cathode resistor 70 to a negative voltage B−. Thus connected, the tube 26 is enabled to function as a "cathode follower," and an output connection 72 connects the cathode 50 with the input of both the time modulator TM and the computer C.

A pair of potentiometers 74 and 76 connected between ground and a suitable positive potential have respective center arms 78 and 80 mechanically interconnected as indicated by the broken line 82 in Figure 2. The arm 78 is connected to a cathode 84 of the triode 22, and the arm 80 is connected to a grid 86 of the triode 30. A plate 88 of the latter tube is connected to a suitable positive potential.

Operation

As previously indicated, the time demodulator TD performs a dual function. As long as the pole 52 of the relay 54 remains in engagement with the normally closed contact 58, the circuit of Figure 2 functions to generate a saw-tooth voltage for use as a time search sweep voltage in the time modulator TM. This sweep voltage, available at the connection 72, serves in a well known manner as a reference voltage for varying the time of generation of the gate pulse, and hence of the dual pulse selector gate produced in the time selector TS for comparison with the returned radar pulse. The instant of coincidence of the locally generated selector gate with the unknown time modulated pulse is detected conventionally in the sum detector SD, which component thereupon effects energization of the solenoid 56 of the relay 54. The resulting movement of the relay pole 52 from the contact 58 to the contact 60 converts the time demodulator circuit to integrating function under conventional control of the difference detector DD. The output of the integrator circuit, also available at the connection 72, serves, not only to provide range integrated modulating voltage to the time modulator TM, but also to provide continuous range information in the form of range integrated voltage to the computer C.

When functioning as a saw-tooth voltage generator, the circuit of Figure 2 acts in the nature of a phantastron, which is a form of relaxation oscillator. The saw-tooth voltage is established originally at the plate 14 of the pentode 10. If, by way of illustration, it be assumed that the voltage on the plate 14 is initially at its maximum level and that the tube 10 thereafter begins to conduct in normal fashion, with the plate current being determined primarily by the voltage on the main control grid 46, the resulting flow of current through the load resistor 16 effects a reduction in voltage at the plate 14. Since this reduction in plate voltage varies with the increase of plate current, it is evident that a continued uniform increase in conduction through the tube 10 will effect a desired linear variation in voltage at the plate 14.

Referring now to the grid-cathode circuit of the tube 10 as depicted in Figure 2, the cathode 12 is maintained continuously at ground potential, whereas the grid 46 is connected through a resistor 64 to ground. This means that, while the grid 46 may be driven to a potential which is different from that of the grounded cathode 12, it will tend constantly to return to ground potential. Thus, by rendering the grid 46 negative at a time when the plate potential of the tube 10 is at a relatively high level, the inherent return of the grid 46 toward ground potential will effect a corresponding increase in plate current with consequent desired decrease in plate potential.

It will be noted, incidentally, that the voltage developed at the plate 14 of the pentode 10 is not employed directly as output from the circuit under discussion, but rather that the plate 14 is connected to the grid 24 of the triode 26, the latter tube being connected as a continuously conducting cathode follower. Thus, the actual plate voltage of the tube 10 is used as input to the cathode follower tube 26, while the output voltage taken from the cathode 50 of the latter tube is employed, not only as the D.C. reference control voltage described above as being fed to the time modulator TM for sweeping the gate pulse, but also for feeding into the computer C as one factor, target distance for example, determining the tracking control for a gun or similar device.

In addition to these two uses of the D.C. voltage output of the cathode follower tube 26, however, a portion of the output of the latter is fed back through the capacitors 48 and 66 to the control grid 46 of the pentode 10. This feedback causes the grid 46 to go negative in preparation for a subsequent return to ground potential as above described.

The critical variations in control grid potential of the tube 10 are illustrated in the second curve from the top of Figure 3, beginning from a condition, prior to the time $t_0$, wherein the plate potential is at a maximum due to substantial absence of plate current. The absence of plate current, to be explained hereinafter, is not here a function of control grid potential, since the grid 46 is, at the time in question, assumed to be at zero potential by virtue of its connection to ground (through the resistor 64). This condition obtains, incidentally, despite the fact that the capacitors 48 and 66 are at the same time charged to a maximum which corresponds to the maximum plate voltage of the tube 10.

It is under these conditions that plate current begins to flow in the tube 10 at the time $t_0$. The resulting drop in voltage at the plate 14 is, of course, accompanied by corresponding voltage reductions at both the grid 24 and the cathode 50 of the tube 26. The substantially instantaneous drop of potential at the cathode 50, however, is transmitted by the capacitors 48 and 66 to the control grid 46 of the tube 10 which is thereby rendered negative, the condition which was sought to be established.

The magnitude of the above-described negative grid swing is regulated inherently within the circuit of the tube 10. Thus, while the initial drop of plate potential serves to establish a negative grid, the negative going grid, in turn, causes plate current to be reduced, with consequent increase in plate potential, which then tends to return toward its maximum value. By a proper choice of circuit constants, a desired negative grid swing is attained with a relatively minor reduction in plate voltage below maximum.

As previously mentioned, the grid 46 of the tube 10, upon being rendered negative, begins immediately to return to ground potential, thereby effecting progressive increase of plate current and accompanying decrease of plate voltage. Although the resistor 64 is a major determinant of the rate at which the grid 46 returns toward ground potential, it should also be noted at this point that the decline in voltage at the plate 14 resulting from the return swing of the grid 46 acts through the cathode follower tube 26 and the feedback capacitors 48 and 66 in a manner tending actually to drive the grid 46 more negative. Since, however, the rate at which the plate potential of the tube 10 now decreases is much slower, than the initial drop above-mentioned, for example, the feedback to the grid 46 is insufficient to do more than retard the return swing of the latter. Actually, a relatively slow return swing is desired and, again, it is evident that the circuits are self-regulating. If the grid 46 returns toward zero potential too fast, more feedback will be adduced to resist the two rapid return, and vice versa. The rate of change of grid voltage is primarily determined by the time constant established by the particular values of the capacitors 48 and 66 and of the resistor 64. In other words, the values of these latter elements determine, ultimately, the slope of the useful portion of the saw-tooth curve of voltage.

The condition of declining plate voltage in the tube 10 continues until a voltage level is reached at which the tube 30 begins to conduct. This conduction occurs by virtue of the previously described connection of the cathode 28 of the tube 30 to the plate 14 of the pentode 10, whereby the voltage of the cathode 28 decreases along with that of the plate 14 until eventually the cathode 28 becomes negative with respect to the grid 86 by an amount sufficient to cause the tube 30 to conduct. Now, inasmuch as this current through the tube 30 is conducted also through the pentode 10, and since the total current flow through the latter is a function of its own grid potential, it is evident that whatever current flows through the tube 30 will, in effect, be substituted for current that would otherwise be drawn through the load resistor 16. Thus, the decline in plate potential of the tube 10 is halted at a point which is, of course, the lower end of the inclined portion of the saw-tooth wave.

At this point, designated by the time line $t_1$ in Figure 3, several things occur very rapidly. First, the abrupt halt in decline of the plate voltage of the tube 10 is effective, through the tube 26, to end the aforementioned retarding feedback to the control grid 46 of the tube 10. This enables the grid 46 to swing more rapidly toward zero potential, with consequent tendency to increase current flow through the tube 10. This latter tendency is, however, confronted with a situation in which the plate voltage of the tube 10 has been reduced substantially below the voltage of the screen 34 of this tube. The screen voltage is, of course, established normally by the voltage dividing network 36 comprising the resistances 38, 40 and 42. However, when the voltage of the plate 14 drops below that of the screen 34, it is the latter which functions to attract the major flow of electrons and thereby to conduct the main tube current. Thus, when the control grid 46 of tube 10 swings rapidly less negative at the time $t_1$, it is the screen current which is significantly affected, and the screen voltage drops abruptly as shown by the third curve in Figure 3.

The suppressor 32 of the pentode 10 has a normal voltage, also established by the voltage dividing network 36, well below that of the screen 34, the difference being established by the resistance 40 connected between the elements 32 and 34. Due to the capacitor 44, however, the voltage on the suppressor 32 will be decreased along with the voltage on the screen 34 under the above-described condition of increased current flow through the latter. When the suppressor 32 is thus driven to a substantial negative voltage, it has the effect of completely inhibiting plate current flow, from which it is evident that current conduction through the load resistor 16 is effectively stopped and the plate voltage of the tube 10 starts to rise quickly toward the B+ voltage applied to the resistor 16. This then is the fly-back portion of the saw-tooth wave as indicated between the time lines $t_1$ and $t_2$ in Figure 3.

As soon as the suppressor 32 has made its negative swing, the capacitor 44 begins to discharge in a manner to cause the suppressor voltage to start back toward its original value. This reduction in negative potential on the suppressor 32, clearly indicated in the fourth curve of Figure 3, together with the aforementioned increase in voltage on the plate 14, causes the latter once more to resume conduction whereupon both the screen voltage and the suppressor voltage are immediately returned to their normal values. Thus, conditions are established for the generation of another saw-tooth wave.

It is evident from the foregoing discussion that the low value of the saw-tooth voltage established at the plate 14 is determined by the commencement of conduction through the tube 30. The commencement of conduction through the tube 30 is, in turn, a function, not only of its cathode voltage, which varies with the voltage of the plate 14, but also of its grid voltage, which is adjustable through the potentiometer 76. Inasmuch as the potentiometer 76 predetermines the voltage required upon the cathode 28 of the tube 30 before the latter can conduct, it is obvious that by manipulating the arm 80 of the potentiometer 76, the low point of the saw-tooth curve may be positioned more or less negative as desired.

The maximum voltage of the saw-tooth curve under discussion is established by functioning of the tube 22. From the diagram of Figure 2, the connection of the tube 22 is such that, as the voltage of the plate 14 of the tube 10 increases from its minimum value, the voltage of the plate 20 of the tube 22 also increases until eventually the latter becomes positive with respect to the cathode 84. Thereupon, the tube 22 conducts and, by establishing its own plate current in the resistor 16, prevents further rise in the voltage of either its own plate or that of the tube 10. Clearly, then, this establishes the maximum value of the saw-tooth voltage here considered and determines also a corresponding level from which the linear portion of the saw-tooth voltage begins to descend. Since the voltage of the cathode 84 is selectively predetermined through the potentiometer 74, the latter also predetermines the maximum voltage at the plates 20 and 14.

From the foregoing then, it is apparent that the maximum and minimum levels of the saw-tooth time search curve are controllable through the potentiometer 74 and 76, respectively. Thus, since the linear sweep portion of this time search curve defines a corresponding intercept of the main saw-tooth curve generated between successive radar pulses in the time modulator TM, and since this sweep voltage is employed ultimately to vary the time of generation of the selector gate, it is apparent that the latter may be swept over any small portion of the time lapse between successive radar pulses. The beginning of the portion is determined by the setting of the potentiometer 74 and the end of the portion is determined by the setting of the potentiometer 76. These two potentiometers, mechanically interconnected, provide a fixed time lapse between the beginning and ending of the search portion, which amounts to searching a particular selected portion of range from the point of transmission of the radar pulses.

When, as a result of the search function above-described, the selector gate is brought into coincidence with the target pulse, the sum detector SD responds in a well understood manner to energize the coil 56 of the relay 54. The resulting movement of the pole 52 disestablishes the connection of the grid 46 of the tube 10 through the resistor 64 to ground and connects it instead through the resistor 62 to the difference detector DD. During the time of movement of the pole 52 from the contact 58 to the contact 60, the capacitor 48 is effective to maintain the grid 46 at substantially the potential which it had when the selector gate came into coincidence with the target pulse.

With the selector gate once brought into coincidence with the target pulse, the circuit of Figure 2 need no longer continue its function of generating a slow saw-tooth curve and thus ceases to function as a phantastron as soon as the aforementioned disconnection between the grid 46 and the resistor 64 is made. The subsequent connection of the grid 46 to the difference detector DD enables the circuit now to function as a Miller integrator.

The difference detector DD, shown in block form in the diagram of Figure 1, functions in conventional manner to detect any tendency or inclination of the selector gate and the target pulse to lose coincidence with one another. Thus, the early and late gate pulses comprising the selector gate are matched with the returned signal or the target pulse so that, in the event one or the other of the gate pulses should begin to lose coincidence with the target pulse, a voltage change is delivered through the resistor 62 to the grid 46. Depending upon which gate pulse tends to lose coincidence, the voltage applied to the grid 46 is increased or decreased. This variation of voltage on the control grid 46 of the tube 10 causes a corresponding variation in the plate current, hence in the plate voltage, and finally in the D.-C. reference voltage, which functions to shift the selector gate back toward complete coincidence with the target pulse. Even though the target distance or range may be constantly changing, the difference detector DD will cause the time demodulator TD to follow the changes in range and keep the target pulse and selector gate in coincidence. As previously indicated, the D.-C. reference voltage, available at the connection 72, is fed not only to the time modulator TM for maintaining closed loop control, but also to the computer C for use as range information.

The block diagram of Figure 1 indicates that an additional integrator, if used, would be incorporated ahead of the dual purpose time demodulator TD. Such an additional integrator might be employed to detect rate of change of range, which information could also be supplied to the computer C.

If for any reason, such as fading of the signal, for example, coincidence should be lost between the target pulse and the selector gate, the sum detector SD will cause the coil 56 of the relay 54 to be deenergized, and the circuit will be reestablished for searching the desired portion of time in order once more to establish coincidence and lock-on of pulses.

Clearly, there has been disclosed an automatic time demodulator which fulfills the objects and advantages sought therefor.

It is to be understood that the foregoing description and the accompanying drawings have been given only by way of illustration and example. It is further to be understood that changes in the circuit, including rearrangement of elements, the substitution of equivalent elements, and the changing of electrical values, all of which will be readily apparent to those skilled in the art, are contemplated as being within the scope of the invention, which is limited only by the claims which follow.

What is claimed is:

1. In an electronic comparing system, in combination, means for sending and receiving pulses, means for generating a gate pulse for comparison with a received pulse, means for comparing the time of occurrence of the gate pulse with the received pulse, said comparing means including means responsive to substantial synchronization of the compared pulses and means responsive to desynchronization of the compared pulses, and automatic time demodulating means comprising an electronic means for initially functioning as an oscillator to generate a sawtooth reference voltage effective to vary the time of generation of the local pulse so as to achieve synchronization of the compared pulses and subsequently functioning in response to the synchronized pulses to maintain synchronization, said time demodulating means further including switch means adapted for automatic actuation by said means responsive to synchronization of the compared pulses for converting from said initial function to said subsequent function.

2. The combination of claim 1 wherein the dual function electronic means has a plate and a main control grid, means interconnecting said plate and said grid for capacitive feedback to the grid, said grid being connected also to the aforesaid switch means, said switch means having a normally closed connection to a return resistance and a normally open connection to the means responsive to desynchronization of the compared pulses.

3. In combination with a radar system comprising means for sending and receiving radar pulses, means for generating a selector gate in predetermined correspondence with transmitted signals, and means including a sum detector and a difference detector for comparing the locally generated selector gate with a received radar pulse; an automatic time demodulator comprising an electron tube, circuit means including a grid resistor connecting said tube for functioning as a time search generator in cooperation with said means for generating a selector gate, means responsive to said sum detector for disconnecting said tube from functioning as a time search generator, said grid resistor and reconnecting said tube for amplification of the input from said difference detector.

4. The combination of claim 3 wherein the electron tube includes a main control grid and wherein the circuit means includes a feedback capacitor connected to said grid.

5. The combination of claim 4 wherein the circuit means includes a second electron tube connected as cathode follower with respect to the first mentioned electron tube.

6. The combination of claim 4 wherein the first mentioned electron tube includes a plate, and means connected with said plate for adjustably limiting its upper and lower levels of voltage.

7. The combination of claim 6 wherein the voltage limiting means comprises two triodes, one having plate connection and the other having cathode connection with the plate of the first mentioned electron tube, and adjustable voltage dividing means connected to the cathode of the one triode and to the plate of the other triode.

8. The combination of claim 7 wherein the adjustable voltage dividing means comprises mechanically interconnected potentiometers arranged for simultaneously increasing the voltage of one and decreasing the voltage of the other of the triode elements connected thereto.

9. The combination of claim 4 wherein the electron tube includes a screen grid and a suppressor grid, and wherein the circuit means includes voltage dividing means connected to said screen grid and said suppressor grid and a capacitor connected between said screen grid and said suppressor grid.

10. In a system of the type described, in combination, an electron tube having a plate, a cathode, and three grids, voltage dividing means connected to two of said three grids, said voltage dividing means including a resistance element connected between said two grids, a capacitance element connected in parallel with said resistance element, means connecting said cathode to ground, means including a plate load-resistor connecting said plate to a source of positive potential, an output circuit connected to said plate, means including capacitive means connecting said output circuit with the third of said three grids for feedback thereto, a grid return resistor, and means including switch means for selectively connecting said third grid to said grid return resistor.

11. The combination of claim 10 plus sum detecting means and difference detecting means, said difference detecting means having a variable voltage output connected to the aforesaid switch means, said sum detecting means being effective to actuate the switch means so as to disconnect the third grid from the grid return resistor and to connect it to the variable voltage output of the difference detector.

12. The combination of claim 10 wherein the output circuit includes a second electron tube having a grid connected to the plate of the first mentioned electron tube and a cathode connected to an output connection, the aforesaid capacitive feedback means comprising a capacitor interconnecting the last mentioned cathode with the third grid.

13. The combination of claim 12 plus a second capacitor interposed between the last mentioned cathode and the grid return resistor.

14. The combination of claim 13 plus means for establishing upper and lower limits of voltage on the plate of the first mentioned electron tube, said means comprising additional electron tube means and potentiometer means, said additional electron tube means including an upper limit tube having a plate connected to the plate of the first mentioned electron tube and a cathode connected to the potentiometer means, and a lower limit tube having a cathode connected to the plate of the first mentioned electron tube and a grid connected to the potentiometer means.

References Cited in the file of this patent

UNITED STATES PATENTS 2,746,032    Moore  _____ May 15, 1956